3,427,264
METAL-FILLED PLASTICS COMPRISING A STYRENE POLYMER AND AN ELASTOMER
Eric O. Forster, Scotch Plains, and Byron M. Vanderbilt, Westfield, N.J., assignors to Esso Research and Engineering Company, a corporation of Delaware
Filed Feb. 7, 1966, Ser. No. 525,475
U.S. Cl. 260—4        15 Claims
Int. Cl. C08f 45/02; C08c 11/04

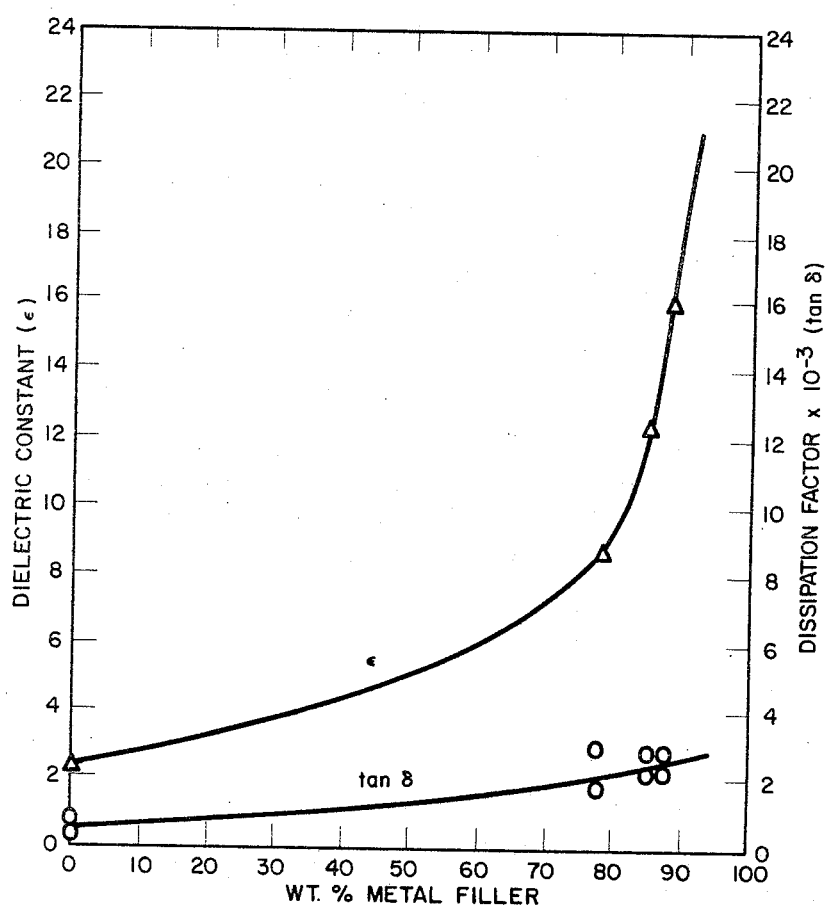
ERIC O. FORSTER
BYRON M. VANDERBILT INVENTORS
BY David A. Roth
ATTORNEY United States Patent Office 3,427,264
Patented Feb. 11, 1969

ABSTRACT OF THE DISCLOSURE

A metal-filled resinifiable mix having good dielectric properties suitable as an electrical insulator comprising a substantially hydrocarbon material including a polymer having 1,2-ethylene type unsaturation and a styrene type monomer wherein said metal has an average particle size of about 0.1 to about 100 microns.

---

This invention relates to metal-filled thermoset plastics and to processes for preparing them. More particularly, it relates to resinifiable substantially hydrocarbon mixes loaded with high levels of finely divided metal or metal oxide particles and to the solid metal-filled thermoset plastics resulting therefrom.

Metal-filled thermoset plastics and processes for preparing them are well known in the prior art, for example, see "Metal-Filled Plastics" by John Delmonte, published by Reinhold Publishing Corp. (New York, N.Y., 1961). The prior art metal-filled molded plastics generally contain a maximum of about 50 wt. percent of metal particles and do not have good flexural, compressive and tensile strengths when the proportion of metal particles exceeds 50 wt. percent. Moreover, the prior art processes suffer from the disadvantage that in the case of high density metal particles such as iron or nickel, the particles do not remain homogeneously suspended in the polymeric matrix and the result is a non-uniform, highly brittle product. Finally, the desideratum of the prior art processes has been to achieve a product which is highly conductive, i.e., one in which the metal particles are held in electrical particle-to-particle contact therein, e.g., see U.S. Patents 3,140,342, issued July 7, 1965 and U.S. 3,202,488, issued Aug. 24, 1965 to J. E. Ehrreich et al.

It has now been found that moldable, non-brittle, thermoset plastics homogeneously loaded with a high level of metal particles may be prepared from novel metal-filled resinifiable thermosetting mixtures. Even more significantly, these mixtures lead to products having extremely low levels of electrical conductivity and exceptionally high dielectric constants, e.g., the products serve as excellent insulators and when employed as a dielectric medium in capacitors, the capacitance is increased from 5 to 100 times or more than that exhibited by the prior art capacitors such as air capacitors. In addition, the use of the present products in the form of thin sheets permits the distance between the plates of the capacitor to be substantially reduced thereby increasing the capacitance even further. Conversely, the same capacitance as is present in the prior art capacitors may be achieved by using the instant products as the dielectric medium and substantially reducing the thickness of the capacitor plates; in this latter case, the resultant capacitor would be highly useful for miniaturization applications.

It is quite surprising that the products of the present invention are nonconductors of electricity. It has been found that within limits, the dielectric constant of the metal-filled plastic increases with increasing metal filler particle size and yet the prior art products which make use of large particle size metal fillers are excellent electrical conductors; indeed, the prior art products have been suggested for use as the plates of capacitors and not as the dielectric medium between the plates, see "Metal-Filled Plastics," supra, page 195. Furthermore, it would be expected that the electrical conductivity of the metal-filled plastic would rise sharply with increased loadings of metal particles, e.g., see U.S. Patent 3,211,584, issued Oct. 13, 1965 to J. E. Ehrreich. However, it has been unexpectedly found that the electrical conductivity of the present metal-filled plastics rises imperceptibly in contrast to the almost asymptotic rise in the dielectric constant at high levels of metal loadings.

In addition to their use as dielectric materials and insulators (the products of this invention may have dielectric constants of 3 to as high as 100 or more, preferably of at least 10, and resistivities in the range of about $10^4$ to $10^{14}$ ohms-cm.), the metal filled plastics of this invention may be used for noise dampening systems, radiation shielding devices, heating dissipative devices, structural applications, etc. When the metal particles are in the form of whiskers or fine fibers, the metal-filled plastics may exhibit anisotropic electromagnetic properties useful, for example, in recording tapes and electromagnetic filters and gratings. The metal-filled resinifiable thermosetting mixtures of the present invention exhibit flexibility during molding operations (e.g., compression molding, transfer molding, etc.) and the moldings do not crack under the temperature and pressure conditions employed therein. The molded metal-filled plastics of the present invention are not only non-brittle (high brittleness is a problem usually encountered in the prior art products) but also have good impact resistance and high flexural, compressive and tensile strengths; moreover, they also have excellent resistance to aqueous media. The present cured metal-filled plastics are machinable into various shapes including thin sheets but surprisingly, the electrical properties of the machined surfaces are not altered; in accordance with prior art teachings it would be expected that the machined surfaces of metal-filled plastics would exhibit higher electrical conductivities than the unmachined surfaces.

In accordance with this invention, metal-filled plastics are prepared by curing a thermosetting resinifiable mix admixed with metal particles, at least one organic peroxide, and optional amounts of an organosilane. The metal-filled resinifiable thermosetting mixture is prepared by mixing a resinifiable mix, metal particles, peroxides and optional amounts of a silane by any well-known technique such as stirring, kneading, etc., at temperatures of 50 to 150° F., preferably 70 to 125° F.

The components of the resinifiable mix are as follows:

A. The first component of the resinifiable mix is a substantially hydrocarbon material selected from the group consisting of:

(1)(a) About 30 to about 70, preferably 50 to 60 wt. percent based on the weight of the resinifiable mix of a resinous polymer having at least 50% of its total unsaturation as the 1,2-ethylenic type, a number average molecular weight of up to 15,000, preferably 2,000 to 5,000, and prepared from about 50 to 100 mole percent of a $C_4$–$C_6$ conjugated diolefin and about 50 to 0 mole percent of a styrene-type monomer and (b) about 30 to about 70, preferably 40 to 50 wt. percent, based on the weight of the mix, of a reactive diluent; and (2)(a) About 50 to about 95, preferably 70 to 85 wt. percent, based on the weight of the mix, of a styrene-type monomer and (b) about 0.5 to about 20, preferably 5 to 10 wt. percent based on the weight of the mix, of at least one monomeric non-conjugated, multiunsaturated crosslinking agent.

Suitable examples of $C_4$–$C_6$ conjugated diolefins include butadiene, hexadiene, isoprene, dimethyl butadiene, piperylene, methyl pentadiene, etc. The styrene-type monomers are represented by the general formula:

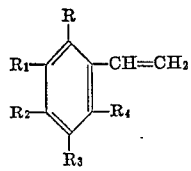

wherein R, $R_1$, $R_2$, $R_3$ and $R_4$ are the same or different groups and are independently selected from the group consisting of hydrogen and $C_1$–$C_{18}$, preferably $C_1$–$C_5$, alkyl radicals. Specific nonlimiting examples of suitable styrene-type monomers include styrene, ortho-methylstyrene, meta-methylstyrene, para-methylstyrene, ortho-ethylstyrene, para-ethylstyrene, 2,3-dimethyl styrene, 2,4-dimethylstyrene, 2,5-dimethylstyrene, para-tert.-butyl-styrene, etc.

When the substantially hydrocarbon material comprises a $C_4$–$C_6$ conjugated diolefinic homopolymer or copolymer, the polymers may be normally liquid or solid in nature depending upon their molecular weights and the mole percentages of the diolefin and styrene-type monomers.

The preferred choice of homopolymer for the substantially hydrocarbon material is homo-polybutadiene having a number average molecular weight of about 2,000 to 5,000 so that it is normally liquid in nature. The preferred choice of copolymer for the substantially hydrocarbon material is the normally liquid copolymer of butadiene and styrene having a number average molecular weight of about 2,000 to 5,000 and a styrene content of about 1 to 30 mole percent. However, it should be understood that the normally solid, resinous copolymers are also useful, particularly those having number average molecular weights of about 8,000 to 15,000.

When the substantially hydrocarbon material is monomeric in nature, the styrene-type monomer is preferably styrene in admixture with at least one monomeric, non-conjugated multiunsaturated crosslinking agent; a detailed description of useful multiunsaturated crosslinking agents appears below.

The substantially hydrocarbon materials to be used in this invention should not contain over about 5 wt. percent, based on the weight of the material, of functional, i.e. non-hydrocarbon, groups such as oxygen, nitrogen, sulfur, halogens, etc. When the substantially hydrocarbon material is to be a $C_4$–$C_6$ conjugated diolefinic homopolymer or copolymer, care should be taken to choose the appropriate polymerization reaction which will yield a polymer having at least 50% of its olefinic unsaturation as the 1,2-ethylenic type. Polymers formed by 1,4-polymerization are not suitable as they do not contain appreciable amounts of the required vinyl side groups. Accordingly, the polymers are preferably prepared with the aid of catalysts such as metallic sodium, alkyl lithiums, etc. The processes for preparing these polymers do not constitute part of this invention for they are old in the art, see for example U.S. Patents 2,762,851 and 3,097,108.

The reactive diluent, employed when the substantially hydrocarbon material is a $C_4$–$C_6$ conjugated diolefinic homopolymer or copolymer, comprises a styrene-type monomer of the type described above. The reactive diluent may be the same or different styrene-type monomer actually used in preparing the $C_4$–$C_6$ conjugated diolefinic copolymer; preferably the reactive diluent is meta-methylstyrene (usually known as vinyl toluene).

The monomeric, non-conjugated multiunsaturated crosslinking agents suitable for the purposes of this invention may be multivinyl aromatic or multivinyl aliphatic compounds. The multivinyl aromatic compounds having the general formula:

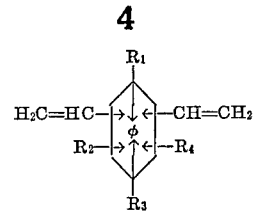

wherein $R_1$, $R_2$, $R_3$ and $R_4$ attached to the ring are each independently selected from the group consisting of hydrogen, halogens, alkyl groups containing up to 4 carbon atoms, and vinyl, and $\phi$ is an aromatic nucleus such as benzene, naphthalene, biphenyl and phenanthrene. Specific examples are divinyl benzene, divinyl toluene, divinyl xylene, divinyl naphthalene, and trivinyl benzene. A preferred compound is divinyl benzene. Other mutiunsaturated monomers of aliphatic nature may be used alone or admixed with the multivinyl aromatic compounds defined above. Theses include the methacrylate esters of $C_2$–$C_{12}$ polyhydric alcohols such as ethylene dimethacrylate, butylene dimethacrylate and the trimethacrylate esters of trimethylol propane. Also the corresponding acrylate esters of $C_2$–$C_{12}$ polyhydric alcohols may be used, or multivinyl esters such as divinyl adipate and multiallyl esters such as triallyl cyanurate (preferably used as a solution in petroleum ether or other organic solvent) may be used; vinyl fumarate, allyl fumarate, and the multivinyl ethers are likewise applicable. However, the multivinyl aromatics and the methacrylate esters of the polyhydric alcohols are preferred. If divinyl benzene is employed in this embodiment, it is advantageous to have it contain a minimum of a styrene-type monomer and saturates such as diethyl benzene. Commercial grade divinyl benzene contains about 55% of the active ingredient and about 40% of ethyl styrene. Although this concentration of divinyl benzene is applicable, improved results are obtained with divinyl benzene of 80% or even higher concentration.

B. The second component of the resinifiable mix is a peroxide-curable elastomer employed in an amount ranging from about 4 to 35 wt. percent, preferably 6 to 10 wt. percent when the substantially hydrocarbon material is a diolefinic homopolymer or copolymer and a reactive diluent, and preferably 10 to 20 wt. percent when the substantially hydrocarbon material is a styrene-type monomer and a multiunsaturated crosslinking agent, based on the weigth of resinifiable mix. The elastomer will generally have a Mooney viscosity in the range of about 10 to about 70, preferably 25 to 40. It has been found that elastomer is a necessary component of the resinifiable mix since it prevents the metal particles from settling to the bottom of the mix, assures adequate flowability of the metal particles in the resinifiable mix during molding operations and prevents brittleness in thin molded metal-filled plastic segments. Suitable peroxide-curable elastomers include natural rubber, synthetic polyisoprenes, ethylene-alpha olefin copolymers and terpolymers such as ethylene-propylene rubbers, ethylene-propylene-methylene norborene rubbers, etc., butadiene-styrene copolymers, polybutadiene, etc. and mixtures thereof. Natural rubber (pale crepe) is preferred over most synthetic elastomers since the latter may contain extraneous impurities such as soaps, acids, catalyst residues, etc. which may have detrimental effects upon the electrical properties of the metal-filled thermoset plastics.

Admixed with the resinifiable mix is a metal in the form of particles having an average particle size of about 0.1 to about 100, preferably 0.3 to 30 microns, as measured by X-ray line broadening. Small amounts, e.g. 0.1 to 10, preferably 1 to 5 wt. percent, based on the weight of the particles, of particles as large as 200 or as small as 0.01 micron may be tolerated without markedly affecting the electrical and strength properties of the molded metal-filled plastics prepared from the mixture. The metal particles may have any particle shape desired although the selection thereof may depend upon the intended end use of the metal-filled plastic, e.g. spherical shapes are useful where high metal filler loadings are desired, platelets or prismatic shapes are particularly useful where the metal-filled plastic is to be used as a dielectric material for capacitors, whiskers are preferably employed where anisotropic electromagnetic properties are desired, etc. For the purposes of this invention, it is necessary that the metal particles be employed in amounts ranging from about 150 to 1500, preferably 230 to 1000, parts by weight, per 100 parts of the resinifiable mix.

The metal particles to be used in this invention are commercially available and may be prepared by well-known methods such as atomization, decomposition of metal carbonyls or metal hydrides, reduction of metal oxides, ball milling, grinding, etc. For the purposes of this invention, the term "metal" comprises the metallic forms, the metal oxide forms, or mixtures or alloys of various metallic forms, metal oxide forms or metallic-metallic oxide forms of the elements aluminum, indium, tin, lead, bismuth and Group II–B—VII–B elements of the Periodic System such as zinc, cadmium, scandium, titanium, zirconium, vanadium, chromium, molybdenum, tungsten, manganese, rhenium, iron, ruthenium, osmium, cobalt, rhodium, iridium, nickel, palladium, platinum, etc.; the Periodic System employed in describing this invention is that which appears in the Periodic Chart of the Elements on pages i–ii of "The Merck Index," published by Merck and Co., Inc., Rahway, N.J. (Seventh Edition, 1960).

Preferably the metals, alloys or mixtures thereof are employed in their metallic, rather than their metallic oxide forms, although excellent results may be obtained with metals which readily form thin oxide coatings, e.g. aluminum, iron, etc. Best results have been obtained with the use of metals such as aluminum, zinc, iron, cobalt, nickel, tin and lead as well as mixtures thereof. In principle, silver may be used although its cost and density renders it disadvantageous for most applications; copper should be avoided since its tendency to oxidize within the plastic matrix in turn may result in an oxidative breakdown of the plastic matrix.

The mixture of the metal particles and resinifiable mix must also include at least one organic peroxide; the total peroxide content ranges from about 0.5 to about 6, preferably 3 to 4 parts when the substantially hydrocarbon material comprises a conjugated diolefinic homopolymer or copolymer and a reactive diluent and preferably 1 to 2 parts when the substantially hydrocarbon material comprises a styrene-type monomer and a multiunsaturated crosslinking agent, per 100 parts of the resinifiable mix. The peroxide may be any of those well known in the prior art for curing resinifiable thermosetting materials, such as di-tert.-butyl peroxide, 2,5-dimethyl-2,5-bis-(tert.-butyl peroxy) hexane, 2,5-dimethyl-2,5-bis-(tert.-butyl peroxy) hexyne-3, benzoyl peroxide, di-tert.-btuyl-diperphthalate, tert.-butyl perbenzoate, dicumyl peroxide, cumene hydroperoxide, 2,4-di-(tert.-butyl peroxyisopropyl) benzene, tert.-butyl cumyl peroxide, etc. and mixtures thereof. Especially preferred are peroxides and peroxide mixtures wherein the peroxide is suitable for use at curing temperatures of 275° F. and higher such as dicumyl peroxide, benzoyl peroxide, 2,5-dimethyl-2,5-bis-(tert.-butyl peroxy) hexane, 2,5 - dimethyl - 2,5 - bis - (tert.-butyl peroxide) hexyne-3, 2,4-di-(tert.-butyl peroxyisopropyl) benzene, tert.-butyl perbenzoate and mixtures thereof.

Although the monomeric, non-conjugated multiunsaturated crosslinking agent is a necessary ingredient when the substantially hydrocarbon material makes use of a styrene-type monomer (the styrene-type monomer would polymerize to a thermoplastic rather than thermoset condition without the crosslinking agent, it may also be employed where the substantially hydrocarbon material makes use of a C$_4$–C$_6$ conjugated diolefinic homopolymer or copolymer. These resinous polymers possess crosslinking properties and accordingly the crosslinking agents need be used only where such resinous polymers are not present or where end use applications demand a highly crosslinked metal-filled thermoset plastic, i.e. one which is crosslinked to a higher degree than could be achieved via the crosslinking imparted by the C$_4$–C$_6$ conjugated diolefinic homopolymers or copolymers. In the latter case, the multiunsaturated crosslinking agents may be employed in amounts up to 10 wt. percent, preferably 2 to 5 wt. percent, based on the weight of the resinifiable mix.

Finally, the mixture of metal particles, resinifiable mix, peroxide and multiunsaturated crosslinking agent (if used) desirably also contains a coupling agent to impart maximum strength to the metal-filled thermoset plastic. However, it has been found that the electrical properties of the metal-filled thermoset plastic are not in any way deleteriously affected by the absence of the coupling agent; indeed, in certain cases, it appears that slightly higher dielectric constants and slightly lower dissipation factors result when the coupling agent is not present.

The coupling agent which serves to bring about a better bond between metal particles and the plastic matrix is preferably an unsaturated organosilane which is employed in amounts ranging from 0 to about 5, preferably 2 to 4 parts by weight, per 100 parts of the resinifiable polymeric mix. Although the metal particles may be treated with the organosilane rather than adding the organosilane to the resinifiable mix, the latter technique has been found to be more convenient and leads to at least as good or better results.

The term "organosilane" as employed herein includes the silane, its silanols (the corresponding partially or completely hydrolyzed forms of the silane), its siloxanes (the corresponding condensation products of the silanols) and mixtures thereof. The organosilane may be represented by the formula:

wherein $R_1$ is a $C_2$–$C_{16}$ radical containing vinyl-type unsaturation selected from the group consisting of alkenyl, styryl, alkenoylalkyl, and alkenoyloxyalkyl; X is selected from the group consisting of hydroxyl, alkoxy and acyloxy; $R_2$ and $R_3$ are independenly selected from the group consisting of hydroxyl, methyl, alkoxy, acryloxy and $R_1$. Nonlimiting useful compounds, which may be employed are the following: vinyl tri(beta-methoxy ethoxy)-silane, vinyl triethoxy silane, divinyl diethoxy silane, allyl triacetoxy silane; and in place of the vinyl and allyl groups of the above-named compounds, the corresponding styryl, acryloalkyl, methacryloalkyl, acryloxy propyl and methacryloxy propyl compounds. All of the silanes are convertible into the useful corresponding silanols by partial or complete hydrolysis with water. The preferred organosilanes of choice are gamma-methacryloxypropyl trimethoxy silane and vinyl tri-(beta-methoxyethoxy) silane.

The mixture of the resinifiable mix, metal particles, peroxides, crosslinking agents (if used) and organosilanes (if used) may then be cured to yield a metal filled thermoset plastic with the aid of elevated temperatures and pressures. Generally such curing operations take place in a mold (by the well-known techniques of compression or transfer molding) of the shape desired for end-use applications. Curing temperatures should be in the general range of about 150 to about 400° F., preferably 310 to 350° F. when the substantially hydrocarbon material is a conjugated diolefinic homopolymer or copolymer and a reactive diulent, and preferably at 220 to 275° F. when the substantially hydrocarbon material is a styrene-type monomer and a multiunsaturated crosslinking agent; the pressure during molding operations is generally in the range of about 100 to about 2000 p.s.i.g., preferably 500 to 1000 p.s.i.g., and the curing time may range from about 10 minutes to about two hours, preferably 30 minutes to one hours.

The following examples are submitted to illustrate the invention. Unless otherwise indicated, all parts and percentages are based upon weight.

EXAMPLE 1

A resinifiable mix was prepared as follows:

| Component: | Parts |
|---|---|
| Liquid polybutadiene, mol. wt., 2000 | 56 |
| Vinyl toluene | 36 |
| Pale crepe rubber, 62 Mooney | 4 |
| Ethylene dimethacrylate | 4 |
| Dicumyl peroxide | 2 |
| 2.5-dimethyl-2,5-bis-(tert. butyl peroxy) hexane | 2 |

Metal particles and a silane were added to the mix set forth above and the resultant metal-filled, resinifiable thermosetting mixture was allowed to stand overnight and remixed prior to molding. Panels 9 x 5 x ⅛ inch were mold-cured one hour at a cure temperature of 320° F. and a total pressure of 45 tons to insure closing of the mold to the stops. All of the panels were subsequently post-cured at 325° F. for 2 hours to insure that a maximum cure had been obtained. A gasket installation of rubber tape was placed around the cavity to provide sufficient back pressure to squeeze out entrapped air and a commercial grade of polyester film, 1.5 mils, was used for mold release in order to avoid the use of extraneous mold release agents. Table I below indicates the values obtained when the post-cured specimens were evaluated for flexural strength at room temperature and for flexural strength following immersion in boiling water for 7 days. In the examples, the symbols MPTMS and VTMS denote gamma-methacryloxypropyl trimethoxy silane and vinyl tri-(beta-methoxyethoxy) silane, respectively.

From the results shown in Table I, it can be seen that the metal-filled resinifiable, thermosetting mixtures (in which the metal fillers did not settle out over a period of time) can be cured to provide molded non-porous products which have exceptionally high flexural strengths. These high strength products are obtained, particularly when a silane is present, even at loadings of over 90% metal filler—a surprising result since it would be expected that such loadings would cause the product to be highly brittle and hence incapable of possessing flexural strengths. Table I indicates also that a variety of metals and metal oxides may be used as the fillers with equally good results.

EXAMPLE 2

The procedure set forth in Example 1 was repeated with a resinifiable mix comprising 36 parts of styrene, 1 part of divinyl benzene, 4 parts of pale crepe rubber and 0.4 part of benzoyl peroxide. The resinifiable mix was then admixed with aluminimum powder and the silane and the mixture was then molded in accordance with the procedure set forth in Example 1 with curing taking place at 200° F. for one hour and post-curing at 300° F. for 2 hours. The results are shown in Table II below in which the post-cured specimens were evaluated for flexural strength at room temperature and for flexural strength following immersion in boiling water for 7 days.

TABLE II

| Metal Filler | Silane | Final Mixture, Parts | | | Flexural Strength, p.s.i. | |
|---|---|---|---|---|---|---|
| | | Resinifiable Mix | Filler | Metal Silane | Original | 7-Day Boil |
| Al, average particle size 1.8μ | | 100 | 300 | 0 | 4,200 | 6,870 |
| Do | MPTMS | 100 | 300 | 3 | 10,450 | 11,005 |
| Do | MPTMS [1] | 100 | 300 | | 10,815 | 11,650 |

[1] Silane applied directly to metal filler.

The results in Table II demonstrate that a highly monomeric system may be employed as the substantially hydrocarbon material. The results obtained with the highly monomeric system are comparable to those obtained with a highly polymeric system (compare Tables I and II).

EXAMPLE 3

A butadiene-styrene rubber (SBR) was prepared by emulsion copolymerization, using soaps, of butadiene and styrene in a 75:25 ratio; the rubber was coagulated by means of the usual salt-acid process, washed with

TABLE I

| Metal Filler | Silane | Final Mixture, Parts | | | Flexural Strength, p.s.i. | |
|---|---|---|---|---|---|---|
| | | Resinifiable Mix | Metal Filler | Silane | Original | 7-Day Boil |
| Al, average particle size 1.8 μ | | 100 | 300 | 0 | 5,675 | 5,250 |
| Do | MTPMS | 100 | 300 | 3 | 14,145 | 13,860 |
| Do | VTMS | 100 | 300 | 3 | 14,400 | 13,560 |
| Do | MPTMS [1] | 100 | 300 | | 13,030 | 12,715 |
| Al₂O₃, 40% through 200 mesh | | 100 | 150 | 0 | 5,000 | 5,000 |
| Do | VTMS | 100 | 150 | 2.25 | 14,000 | 13,000 |
| Cr, 200 mesh | | 100 | 786 | 0 | 6,175 | 4,545 |
| Do | MPTMS | 100 | 786 | 3 | 9,335 | 6,820 |
| Fe, average particle size 1 μ | | 100 | 437 | 0 | 6,560 | 5,850 |
| Do | MPTMS | 100 | 437 | 3 | 12,080 | 7,950 |
| Fe, average particle, size 3 μ | | 100 | 400 | 0 | 1,710 | |
| Do | MPTMS | 100 | 400 | 3 | 9,730 | 9,600 |
| Do | VTMS | 100 | 400 | 1.5 | 11,760 | 12,800 |
| Fe₂O₃ average particle size 8 μ | | 100 | 160 | 0 | 8,110 | 7,835 |
| Do | MPTMS | 100 | 160 | 3 | 14,035 | 13,025 |
| Fe₃O₄ average particle size 8 μ | MPTMS | 100 | 175 | 3 | 12,550 | 9,300 |
| Pb, 200 mesh | | 100 | 1,260 | 0 | 4,760 | 4,165 |
| Do | MPTMS | 100 | 1,260 | 3 | 10,105 | 6,985 |
| Ni, 200 mesh | | 100 | 988 | 0 | 5,760 | 4,450 |
| Do | MPTMS | 100 | 988 | 3 | 8,420 | 7,865 |
| Sn, 200 mesh | | 100 | 808 | 0 | 7,260 | 5,870 |
| Do | MPTMS | 100 | 808 | 3 | 10,360 | 9,445 |
| Zn, 200 mesh | | 100 | 800 | 0 | 6,375 | 3,855 |
| Do | MPTMS | 100 | 800 | 3 | 14,790 | 5,183 |

[1] Silane applied directly to metal filler.

dilute sodium hydroxide and finally washed with water. After drying, it was found that the rubber contained 0.35% of fatty acids and 0.10% of soap. The dried rubber, admixed with 1.25 wt. percent of an organic phosphite antioxidant, was then milled on a watercooled roller mill until the Mooney viscosity was reduced to 28. Fifteen parts of the resultant rubber were then dissolved in 85 parts of vinyl toluene to give a clear viscous solution which was subsequently utilized in the following mix:

Recipe A

| | Parts |
|---|---|
| SBR in vinyl toluene (15% solution) | 40 |
| Liquid polybutadiene, mol. wt., 2000 | 56 |
| Ethylene dimethacrylate | 4 |
| α-Methacryloxypropyl trimethoxy silane | 2 |
| Dicumyl peroxide | 2 |
| 2,5 - dimethyl - 2,5 - bis - (tert - butyl peroxy) hexyne - 3 | 2 |

The resinifiable mix set forth in Recipe A was thoroughly mixed with 800 parts of 200 mesh powdered zinc and allowed to stand overnight. The zinc-filled, resinifiable, thermosetting mixture was then briefly remixed and cured in a ⅛ inch deep cavity mold for one hour at 320° F. A smooth plate, which had a uniform appearance, was obtained; half of the molded plate was subsequently post-cured for two hours at 325° F.

The procedure set forth immediately above was followed with the following resinifible mix:

Recipe B

| | Parts |
|---|---|
| Liquid polybutadiene, mol wt. 2000 | 60 |
| Vinyl toluene | 36 |
| Ethylene dimethacrylate | 4 |
| α-Methacryloxypropyl trimethoxy silane | 2 |
| Dicumyl peroxide | 2 |
| 2,5 - dimethyl - 2,5 - bis - (tert. - butylperoxy) hexyne - 3 | 2 |

The resinifiable mix set forth in Recipe B was thoroughly mixed with 800 parts of 200 mesh powdered zinc and allowed to stand overnight. On the next day it was noted that the mixture had separated into a dense zinc filler-rich lower layer and a resinous-rich upper layer. The mixture was briefly remixed and subsequently cured in a ⅛ inch deep cavity mold for one hour at 320° F. A non-uniform plate was obtained as evidenced by a glossy resinous appearance on the top and a metallic color on the bottom side. One-half of the plate was post-cured for two hours at 325° F. The physical properties of the molded plates are shown in Table III below.

TABLE III

| Sample | Flexural Strength, p.s.i. | Notched Izod Impact |
|---|---|---|
| Recipe A, mold cured | 14,415 | |
| Recipe B, mold cured | 5,150 | |
| Recipe A, post-cured | 13,865 | 0.78 |
| Recipe B, post-cured | 8,715 | 0.61 |

Table III illustrates the necessity for a rubber (which need not necessarily be natural rubber) in the resinifiable mix. Not only does the rubber impart a marked improvement in fluxural strength but it results in a less brittle molding (as shown by a higher Izod impact value).

EXAMPLE 4

A metal-filled resinifiable thermosetting mixture was prepared by admixing aluminum particles with a resinifiable mix taught by the prior act to be useful siliceous and carbonaceous fillers, see Society of Plastic Engineers' Journal, vol. 21, pp. 288–294 (March 1965). The mix consisted of:

| | Parts |
|---|---|
| Copolymer of Example 3 | 75 |
| Styrene-butadiene rubber | 25 |
| VTMS | 1.2 |
| 2,4 - di - (tert. - butylperoxyisopropyl) benzene | 4 |
| Al avg. part. size, 1.8μ | 400 |

The mixture was prepared in a kneader, allowed to stand overnight and then cured in a ⅛ inch deep cavity mold at 370° F. for 15 minutes. The resultant molded specimen was excessively flexible and had a flexural strength of only 4,680 p.s.i. As pointed out in the SPE Journal article supra, had the filler been silica, the flexural strength would have been 14,000 p.s.i., thus indicating that a reactive diluent such as vinyl toluene must be used in the case of metallic fillers.

EXAMPLE 5

Exmples 3 and 4 were repeated with the following metal-filled resinifiable mixture:

| Component: | Parts |
|---|---|
| Polybutadiene, mol wt., 2000 | 56 |
| Vinyl toluene | 36 |
| Pale crepe rubber | 4 |
| Ethylene dimethacrylate | 4 |
| VTMS | 1.2 |
| Dicumyl peroxide | 2 |
| 2,4-di-(tert.-butylperoxyisopropyl) benzene | 2 |
| Al, avg. part. size 1.8μ | 300 |

The mixture was sufficiently fluid so that it could be homogeneously stirred with a simple propeller mixer. On standing overnight, there was no tendency for the aluminum particles to settle out. On curing at 320° F. for one hour in a cavity mold, an excellent non-brittle molded speciment with a flexural strength of 13,800 p.s.i. was obtained. Thus Examples 3–5 point out the need for a peroxide-curable elastomer to prevent phase separation of the metal filler and consequent brittleness of the molded product (compare Examples 3 and 5) as well as a reactive diluent such as vinyl toluene to reduce excessive flexibility and impart fluxural strength (compare Examples 4 and 5).

EXAMPLE 6

Metal-filled resinifiable mixtures were prepared from the following components:

| Component: | Parts |
|---|---|
| Polybutadiene, mol. wt., 2000 | 56 |
| Vinyl toluene | 34 |
| Pale crepe rubber | 6 |
| Ethylene dimethacrylate | 4 |
| VTMS | 1.2 |
| Dicumyl peroxide | 2 |
| Dicumyl di-tert.-butyl peroxide | 2 |
| Iron powder, various particles sizes | 320 |

After curing the mixtures in accordance with the procedure set forth in Example 1, the molded specimens were evaluated for their dielectric constants in accordance with ASTM Test Method D–150–59T. The high dielectric constants obtained (in the order of 100) indicated a substantial lack of any particle-to-particle contacts in the molded specimens although the average particle sizes ranged from as low as 1μ to as high as 50μ. Moreover, examination of the particles in the molded specimens by X-ray line broadening and electron microscopy showed no agglomeration of particles, i.e. the particles in the molded samples were at least as small as those of the original powders used in preparing the metal-filled resinifiable mixture.

EXAMPLE 7

A synthetic polyisoprene was prepared by alkyl metal-catalyzed polymerization of isoprene and subsequently treated by well-known methods to reduce its impurity content to less than 1%. The rubber was subsequently broken down on a cold roller mill to a Mooney viscosity of 14 and the resultant rubber was then dissolved in vinyl toluene to give at 25 wt. percent solution of rubber. This solution was then utilized in the following metal-filled resinifiable mixture:

|  | Parts |
|---|---|
| Polyisoprene in vinyl toluene (25 wt. percent solution) (λ) | 44 |
| Liquid polybutadiene, mol wt. 2000 | 52 |
| Ethylene dimethacrylate | 4 |
| α-Methacryloxypropyl trimethoxy silane | 3 |
| Dicumyl peroxide | 2 |
| 2,5-dimethyl-2,5-bis-(tert.-butylperoxy) hexane | 2 |
| Iron powder, avg. part. size, 1μ | 600 |

The above metal-filled resinifiable mixture was allowed to stand for two days, briefly remixed and cured as set forth in Example 3. The mixture had excellent flow characteristics during molding and molded specimens had uniform physical and electrical properties. A representative molded specimen had a Barcol Hardness of 60 and a flexural strength of 12,335 p.s.i.; this indicates that when the resinifiable mix contains a peroxide-curable elastomer in a concentration of over 10 wt. percent based on the weight of the mix (without metal fillers), hard, strong moldings can be readily prepared.

EXAMPLE 8

A metal-filled resinifiable mixture using nickel powder (200 mesh) and the resinifiable mix set forth in Example 6 was prepared and cured in accordance with the procedure set forth in Example 1. The accompanying figure graphically illustrates the effect of the wt. percent concentration of the metal filler, based upon the weight of the metal-filled plastic, upon the dielectric constant of the metal-filled plastic as well as the effect upon the dissipation factor, tan δ (also called loss tangent). From the figure, it is apparent that the dielectric constant rises sharply at high metal-filler loading, i.e., above 60 wt. percent. This is highly surprising since it would be expected that the conductivity and not the dielectric constant would rise sharply in view of the greater number of metal particle-to-particle contacts which would ordinarily result at high loadings. However, the metal-filled thermoset plastics of the present invention have substantially no metal particle-to-particle contacts since the rise in the dissipation factor (which is directly related to conductivity) is almost negligible with increasing metal filler loadings.

EXAMPLE 9

Various metal fillers were admixed with the resinifiable mix and cured as set forth in Example 8. Table IV indicates the effect of these fillers on the dielectric properties of the cured metal-filled plastic specimens (at 25° C. and 10 kc. frequency).

From Table IV, it can be seen that metal-filled plastics having excellent dielectric constants can be prepared in accordance with the present invention. The variation in dissipation factor and resistivity with different fillers is negligible indicating that a wide variety of metal may be used.

EXAMPLE 10

The procedure set forth in Example 1 was repeated with iron particles (avg. part size 1μ) and the weight of the particles was increased from 437 parts to 600 parts per 100 parts of resinifiable mix (no silane was used); it was found that a ⅛ inch molding cracked severely and was therefore not commercially useful. This experiment was repeated with 600 parts of iron particles, 100 parts of resinifiable mix and 3 parts of MPTMS silane, but the pale crepe rubber (39 Mooney) and the vinyl toluene in the resinifiable mix were increased to 6 parts and decreased to 34 parts, respectively; in this case, a commercially useful crack-free ⅛ inch molding was obtained, but a 1/64 inch molding cracked severely after curing. A new resinifiable mix was then prepared with 8 parts of a polyisoprene (27 Mooney) substituted for the pale crepe rubber; in this case, 1/64 inch crack-free moldings were readily obtained. These results indicate that by adjusting the proportion of elastomer in the resinifiable mix, crack-free moldings of paper-thin thickness can be obtained. Moreover, these paper-thin moldings have flexural strengths of 10,000 p.s.i. or higher in spite of the high proportion of elastomer in the resinifiable polymeric mix. The 1/64 inch molded specimens had dielectric constants in excess of 100, resistivities in excess of $10^{13}$ ohms-cm., and dielectric strengths in excess of 600 volt/mil. Evidently the elastomer is also cured during the curing operation and becomes a homogeneous part of the thermoset resin.

EXAMPLE 11

Following the procedure set forth in Example 3, moldings were prepared using 1150 parts of 200 mesh nickel powder and 100 parts of the following resinifiable mixes:

| Component: | Parts |
|---|---|
| Liquid polybutadiene, mol. wt., 2000 | 56 |
| Vinyl toluene | 34 |
| Pale crepe rubber, 62 Mooney | 6 |
| Divinyl benzene, 55% | 4 |
| Dicumyl peroxide | 2 |
| 2,5 - dimethyl - 2,5 - di - (tert. - butylperoxy) hexane | 2 |
| MPTMS silane | 4 |

Specimens cured in accordance with the procedure of Example 3 had dielectric constants in excess of 100 and resistivities in the order of 10,000 ohms-cm. indicating that excellent insulating materials having exceptionally high metal loadings are possible.

EXAMPLE 12

The dielectric constants and dissipation factors (loss tangent) of several examples prepared in accordance with the procedure of Example 1 were measured; the results are set forth in Table V.

TABLE IV

| Filler | Average Particle Size | Filler Wt. percent | Dielectric Constant | Dissipation Factor | Resistivity, ohms/cm. |
|---|---|---|---|---|---|
| None | 200 mesh | 0 | 2.3 | $1\times10^{-3}$ | $10^{15}$ |
| Al | do | 75 | 15.5 | $1\times10^{-2}$ | $10^{14}$ |
| Fe | do | 75 | 24.3 | $2.6\times10^{-2}$ | $3\times10^{13}$ |
| Ni | do | 85 | 12.4 | $3\times10^{-2}$ | $10^{14}$ |

TABLE V.—ELECTRICAL PROPERTIES OF SEVERAL SAMPLES PREPARED AS SET FORTH IN EXAMPLE 1.—100 Kc./s. and 25° C.

| Metal Filler | Silane | Final Mixture, parts | | | Dielectric Constant | Loss Tangent ×10³ |
| --- | --- | --- | --- | --- | --- | --- |
| | | Resinifiable Mix | Metal Filler | Silane | | |
| None | MPTMS | 100 | 0 | 3 | 2.357 | 1.6 |
| None | | 100 | 0 | 0 | 2.398 | 1.4 |
| Al, average particle size 1.8μ | MPTMS | 100 | 300 | 3 | 15.683 | 5.1 |
| Do | | 100 | 300 | 0 | 16.641 | |
| Fe, average particle size 1μ | MPTMS | 100 | 300 | 3 | 9.983 | 47.7 |
| Do | | 100 | 300 | 0 | 18.743 | 16.2 |
| Fe₂O₃, average particle size 8μ | MPTMS | 100 | 150 | 3 | 3.816 | 7.1 |
| Do | | 100 | 150 | 0 | 3.949 | 6.7 |
| Ni, 200 mesh | MPTMS | 100 | 600 | 3 | 23.791 | 3.5 |
| Do | | 100 | 600 | 0 | 27.338 | 3.3 |

The results in Table V show that an organosilane coupling agent is not absolutely necessary in the final mixture in order to obtain a metal-filled plastic having good electrical properties. In all samples where the organosilane was absent, the dielectric constants were at least as high or higher and the loss tangents at least as low or lower than the values obtained when the organosilane was present.

As many apparently widely different embodiments of this invention may be made without departing from the spirit and scope of it, it is to be understood that the present invention is not limited to the specific embodiments herein except as defined in the appended claims.

What is claimed is:

1. A metal-filled resinifiable mixture comprising:
    A. A resinifiable mix comprising:
        (1) a substantially hydrocarbon material selected from the group consisting of:

(a)
            (i) about 30 to about 70 wt. percent based on the weight of the resinifiable mix of a polymer having at least 50% of its olefinic unsaturation as the 1,2-ethylene type, a number average molecular weight of up to about 15,000 and prepared from about 50 to 100 mole percent of a $C_4$ to $C_6$ conjugated diolefin and from about 50 to 0 mole percent of a styrene-type monomer, and
            (ii) about 0.5 to about 20 wt. percent based on the weight of the mix of a reactive diluent comprising a styrene-type monomer; and (b)
            (i) about 50 to about 95 wt. percent based on the weight of the mix of a styrene-type monomer, and
            (ii) about 0.5 to about 30 wt. percent based on the weight of the mix of at least one monomeric, nonconjugated, multi-unsaturated crosslinking agent; and (2) about 4 to about 30 wt. percent based on the weight of the resinifiable mix of a peroxide-curable elastomer;
    B. about 150 to about 1500 parts per hundred based on the resinifiable mix of metal particles having an average particle size of about 0.1 to about 100 microns with less than 10 wt. percent of the particles as large as 200 microns, said metal particles being selected from the group consisting of metals and metal mixtures of aluminum, tin, lead and Group II–B–VII–B elements of the Periodic System; and
    C. at least one organic peroxide; and
    D. 0 to about 10 wt. percent, based on the weight of said mix, of said multiunsaturated crosslinking agent; and
    E. 0 to about 5 parts by weight, per 100 parts of said mix, of an organosilane compound selected from the group consisting of an unsaturated silane, its silanols, its siloxanes and mixtures thereof.

2. The metal-filled resinifiable mixture of claim 1 wherein the polymer is present in an amount of about 30 to about 70 wt. percent and the reactive diluent is present in an amount of about 30 to about 70 wt. percent based on the weight of the resinifiable mix.

3. The mixture of claim 2 in which the $C_4$–$C_6$ conjugated diolefinic polymer is a homopolymer of butadiene.

4. The mixture of claim 2 in which the $C_4$–$C_6$ conjugated diolefinic polymer is a copolymer of butadiene and styrene.

5. The mixture of claim 2 in which the reactive diluent is vinyl toluene.

6. The mixture of claim 1 in which the styrene-type monomer is styrene.

7. The mixture of claim 1 in which the multiunsaturated crosslinking agent is divinyl benzene.

8. The mixture of claim 1 in which the multiunsaturated crosslinking agent is ethylene dimethacrylate.

9. The mixture of claim 1 in which the peroxide-curable elastomer is selected from the group consisting of natural rubber, synthetic polyisoprenes, ethylene-alpha olefin copolymers, butadiene-styrene copolymers and polybutadiene and mixtures of two or more elastomers thereof.

10. The mixture of claim 1 in which the metal particles have an average particle size of 3 to 70 microns.

11. The mixture of claim 1 in which the organic peroxide is selected from the group consisting of dicumyl peroxide, benzoyl peroxide, 2,5-dimethyl-2,5-bis-(tert.butyl peroxy) hexane, 2,5-dimethyl-2,5-bis-(tert.butyl peroxy) hexyne-3, 2,4-di-(tert.-butyl peroxyisopropyl) benzene, tert.-butyl perbenzoate, and mixtures thereof.

12. The mixture of claim 1 in which the unsaturated silane is gamma-ethacryloxypropyl trimethoxy silane.

13. The mixture of claim 1 in which the unsaturated silane is vinyl tri-(beta-methoxy ethoxy) silane.

14. The mixture of claim 1 which has been cured to a metal-filled solid thermoset plastic with the aid of elevated temperatures and superatmospheric pressures.

15. The metal-filled plastic of claim 14 in which has a dielectric constant in excess of 10 and a resistivity of about $10^4$ to about $10^{14}$ ohms-cm.

References Cited

UNITED STATES PATENTS

| | | | |
| --- | --- | --- | --- |
| 2,700,185 | 1/1955 | Lee | 260—880 |
| 3,041,303 | 6/1962 | Nelson | 260—41.5 |
| 3,083,175 | 3/1963 | Safford et al. | 260—894 |
| 3,135,715 | 6/1964 | Hinderer | 260—41.5 |
| 3,151,184 | 9/1964 | Safford et al. | 260—880 |
| 3,185,751 | 5/1965 | Sutton | 264—301 |
| 3,290,165 | 12/1966 | Iannicilli | 106—308 |
| 3,301,739 | 1/1967 | Vanderbilt | 161—93 |
| 3,313,764 | 4/1967 | Iino | 260—41.5 |

SAMUEL H. BLECH, *Primary Examiner.*

M. J. TULLY, *Assistant Examiner.*

U.S. Cl. X.R.

260—5, 41, 41.5, 876, 880, 889, 892, 897, 827, 876; 252—63.2, 63.5

UNITED STATES PATENT OFFICE
CERTIFICATE OF CORRECTION

Patent No. 3,427,264                                                          February 11, 1969

Eric O. Forster et al.

It is certified that error appears in the above identified patent and that said Letters Patent are hereby corrected as shown below:

Column 13, line 45, "about 0.5 to about 20" should read -- about 30 to about 70 --; line 53, "30" should read -- 20 --. Column 14, line 47, "ethacryloxypropyl" should read -- methacrycloxypropyl --.

Signed and sealed this 31st day of March 1970.

(SEAL)
Attest:

Edward M. Fletcher, Jr.                                    WILLIAM E. SCHUYLER, JR.
Attesting Officer                                                        Commissioner of Patents